US010386263B2

(12) United States Patent
Langdale et al.

(10) Patent No.: US 10,386,263 B2
(45) Date of Patent: Aug. 20, 2019

(54) APPARATUS AND METHOD FOR PROVIDING ACCESS TO PRESSURIZED PIPES

(71) Applicant: Heath Morgan Group Limited, Weymouth (GB)

(72) Inventors: Simon Langdale, Weymouth (GB); John White, Weymouth (GB)

(73) Assignee: Heath Morgan Group Limited, Weymouth, Dorset (GB)

( * ) Notice: Subject to any disclaimer, the term of this patent is extended or adjusted under 35 U.S.C. 154(b) by 148 days.

(21) Appl. No.: 15/505,750

(22) PCT Filed: Oct. 29, 2014

(86) PCT No.: PCT/GB2014/053222
§ 371 (c)(1),
(2) Date: Feb. 22, 2017

(87) PCT Pub. No.: WO2016/066981
PCT Pub. Date: May 6, 2016

(65) Prior Publication Data
US 2017/0276566 A1  Sep. 28, 2017

(51) Int. Cl.
*G01M 3/28* (2006.01)
*F16L 41/04* (2006.01)
(Continued)

(52) U.S. Cl.
CPC .......... *G01M 3/2815* (2013.01); *F16L 41/04* (2013.01); *G01M 3/04* (2013.01); *G01M 3/3254* (2013.01); *G01M 3/3236* (2013.01)

(58) Field of Classification Search
USPC .......................................................... 73/40
See application file for complete search history.

(56) References Cited

U.S. PATENT DOCUMENTS 3,703,909 A * 11/1972 Erb ................. F16L 41/04
                                              137/318
4,216,793 A *  8/1980 Volgstadt ........... F16L 41/04
                                              137/318
(Continued)

OTHER PUBLICATIONS

Notification of Transmittal of the International Search Report and the Written Opinion of the International Searching Authority, or the Declaration, PCT/GB2014/053222, dated Jul. 13, 2015, 16 pages.

*Primary Examiner* — Clayton E. LaBalle
*Assistant Examiner* — Warren K Fenwick
(74) *Attorney, Agent, or Firm* — Myers Bigel, P.A.

(57) ABSTRACT

An apparatus for providing access to pressurized pipes includes a body member configured to be attached to a pipe or vessel or a fitting coupled to a pipe or vessel. The body member has an internal barrel in fluid communication with the pipe or vessel or fitting when the body member is attached to the pipe or vessel or fitting. A hollow piston is slidable axially within the internal barrel, and the apparatus is configured such that when an internal volume of the piston is pressurized by a fluid from the pipe or vessel, a force exerted by pressurized fluid on the piston in an axial direction is opposed by a force exerted by pressurized fluid on a counter-pressure portion of the piston. The apparatus includes a conduit orifice that allows a conduit to be disposed therethrough so as to pass into the apparatus to an interior of the piston.

19 Claims, 9 Drawing Sheets

(51) Int. Cl.
*G01M 3/04* (2006.01)
*G01M 3/32* (2006.01)

(56) References Cited

U.S. PATENT DOCUMENTS

| | | | | |
|---|---|---|---|---|
| 5,983,736 A * | 11/1999 | Gershman | ............... | G01M 3/22 |
| | | | | 73/865.8 |
| 8,403,039 B2 * | 3/2013 | Howell | ................... | E21B 29/08 |
| | | | | 137/318 |
| 2007/0051192 A1 * | 3/2007 | Penza | ....................... | F16K 7/10 |
| | | | | 73/865.8 |

* cited by examiner

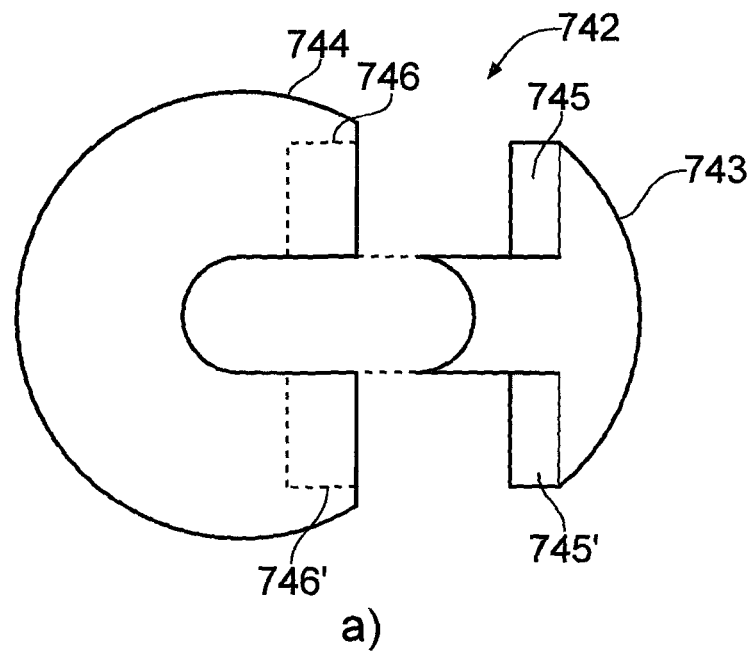
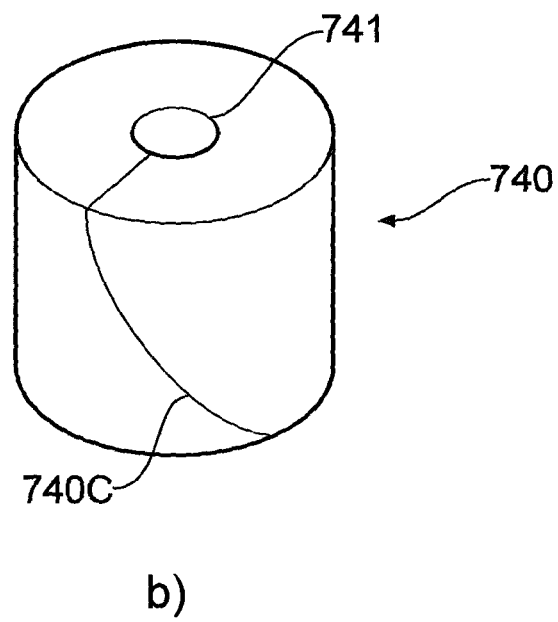
FIG. 8

APPARATUS AND METHOD FOR PROVIDING ACCESS TO PRESSURIZED PIPES

RELATED APPLICATIONS

This application is a 35 U.S.C. § 371 national stage application of PCT Application No. PCT/GB2014/053222, filed on Oct. 29, 2014, the contents of which are incorporated herein by reference in its entirety. The above-referenced PCT International Application was published in the English language as International Publication No. WO 2016/066981 A1 on May 6, 2016.

TECHNICAL FIELD

The present invention relates to equipment for gaining and providing access to pipes, conduits, containers, and other such vessels that may be used to hold fluids. In particular but not exclusively the invention relates to equipment for allowing access to the inside of such vessels whilst such vessels are under pressure, without requiring the vessel to be drained or isolated.

BACKGROUND

In the oil and gas industry it is frequently required to gain access to pipework to carry out inspection or repair work. This often involves a requirement to gain access inside the pipework. In this, and in other industries, it can be inconvenient and expensive to empty, or otherwise decommission the pipe to carry out such work, and so there is a requirement to be able to access the inside of such pipes while they are in use. The fluids being transported or stored in the pipes are generally under pressure. Tools exist for allowing access to vessels under pressure, these generally being known in the industry as retrievers. Retrievers comprise a mechanism that is attachable, or in some cases permanently attached, to a vessel, generally via valve, that essentially comprise a fixed shaft along with a moveable portion, e.g. a rod, with appropriate seals being located therebetween, wherein the moveable portion is able to be fed into a hole in the vessel (via the valve if fitted).

Known retrievers have the disadvantage that the insertion mechanism makes it difficult to insert items such as cameras having long leads attached thereto.

It is an aim of the present invention to address disadvantages associated with the prior art.

SUMMARY OF THE INVENTION

Embodiments of the invention may be understood with reference to the appended claims.

Aspects of the present invention provide an apparatus and a method.

In one aspect of the invention for which protection is sought there is provided an apparatus for providing access to pressurised pipes and the like, the apparatus comprising:

a body member having attachment means for attachment of the body member to a pipe or vessel or a fitting coupled to a pipe or vessel, the body member having an internal barrel that may be provided in fluid communication with the pipe or vessel when the body member is attached to the a pipe, vessel or fitting;

a hollow piston slidable axially within the internal barrel, the apparatus being configured such that when an internal volume of the piston is pressurised by a fluid from the pipe or vessel a force exerted by pressurised fluid on the piston in a first axial direction is opposed by a force exerted by pressurised fluid on a counter-pressure portion of the piston, the apparatus being provided with a conduit orifice adapted to allow a conduit to be disposed therethrough so as to pass into the apparatus to an interior of the piston, wherein a pressure tight seal is formed between the conduit and conduit orifice, the apparatus being configured to allow a first end of the piston to be translated axially into the pipe, vessel or fitting, the piston having a port arranged to allow egress of the conduit from the piston into the pipe, vessel or fitting.

In a further aspect of the invention for which protection is sought there is provided apparatus for providing access to an interior of an object such as a pressurised pipe or the like, the apparatus comprising:

a body member, the body member having an internal barrel that may be provided in fluid communication with an interior of the object;

a hollow piston slidable axially within the internal barrel, the apparatus being configured such that when an internal volume of the piston is pressurised by a fluid from the object a force exerted by pressurised fluid on the piston in a first axial direction is opposed by a force exerted by pressurised fluid on a counter-pressure portion of the piston, the apparatus being provided with a conduit orifice adapted to allow a conduit to be disposed therethrough so as to pass into the apparatus to an interior of the piston, wherein a pressure tight seal is formed between the conduit and conduit orifice, the apparatus being configured to allow a first end of the piston to be translated axially into the object, the piston having a port arranged to allow egress of the conduit from the piston into the object.

The apparatus may therefore allow a conduit to be introduced into an object such as a pressurised pipeline or vessel through a piston by sliding the first end of the piston through an opening in an object such as a pipe, vessel or fitting coupled thereto in order to deliver the conduit to the internal volume of the object. In some embodiments, this may permit an inspection camera to be introduced into the object such as a gas storage or transport pipe or vessel under pressure without disturbing substantially a pressure of gas within the pipe or vessel.

Advantageously, some embodiments of the invention may have a piston having an outer diameter smaller than that of the barrel, the body member incorporating first and second sealing means each arranged to provide a pressure seal between the barrel and the piston at respective first and second axially displaced positions with respect to the barrel, thereby defining a volume therebetween, the counter pressure portion forming a seal between the piston and barrel thereby to isolate respective parts of the volume between the first and second sealing means on each side of the counter-pressure portion into a first volume between the counter-pressure portion and first sealing means and a second volume between the counter-pressure portion and second sealing means such that the relative size of the volumes changes as the piston slides axially within the barrel, with said embodiments having means for allowing equalisation of pressure between an inside region of the piston and the first volume, and means for maintaining the second volume substantially at a predetermined or substantially constant pressure.

The predetermined pressure may be external atmospheric pressure, or may be another predetermined pressure derived for example by a pump, or pressure vessel. The predetermined pressure may be greater than, or lower than, the external atmospheric pressure. The predetermined pressure may be variable, which advantageously has the effect of allowing the position of the piston to be varied according to the pressure applied.

The counter-pressure portion may comprise a collar portion provided around an outer periphery of the piston.

Advantageously, some embodiments may have a planform area of the counter-pressure portion arranged to be substantially similar to that of the planform area of the piston such that the force exerted on the piston by pressurised fluid in the first axial direction away from the first end of the body member is substantially equal to the force exerted by pressurised fluid on the counter-pressure portion in the second axial direction opposite the first.

This feature has the advantage that a net force on the piston due to the pressure of fluid such as a gas of liquid within the piston may be caused to be substantially zero. Thus, a force on the piston exerted by pressurised fluid within an object such as a pipeline to which the apparatus is connected that would otherwise create a force acting to urge the piston away or out from the object may be countered by an opposite force exerted on the counter-pressure portion.

In some embodiments the apparatus may be configured to allow the net force on the piston to be adjusted. Adjustment of the net force may be performed by adjustment of the relative sizes of the planform areas of the piston and counter-pressure portion. Alternatively, adjustment of the net force may be performed by adjustment of the pressure in either the first or second volumes as described above, or by any other suitable means. For example, increasing or decreasing the pressure in the first or second volumes may enable adjustment of the net force.

Advantageously the body may be adapted to be connected to a fitting already mounted to the object. The fitting may incorporate a valve that, when closed, isolates the apparatus from the contents of the object, and when open, allows entry of the piston into the object. The piston diameter is preferably chosen to enable the piston to pass through a standard sized valve, for the standard being employed in a given region of use.

The separation distance between the first and second seal means may be chosen dependent at least in part upon the required degree of axial movement of the piston, bearing in mind also the space taken by the counter-pressure portion. Typically a degree of piston movement will be between a first piston position, wherein a first end of the piston sits outside, for example above the level of, a valve attached to an associated fitting, and a second piston position, such as a lower piston position, where the first end of the piston has passed through the valve and transversely into an object such as a pipe or vessel, optionally substantially fully across the diameter of a pipe or vessel to an opposite wall of the pipe or vessel. A typical range of piston movement may be approximately 420 mm in some embodiments. Other embodiments may be arranged to have different degrees of movement according to the intended application.

In some embodiments the apparatus may be arranged to allow a conduit to be fed into the apparatus through the conduit orifice to allow a payload item coupled to the conduit to be fed into the object to which the apparatus is connected. The payload item may be arranged to be provided in electrical or optical communication with a device external to the apparatus via the conduit as the item enters the object, for example a pipe, and travels through the pipe. The item may for example comprise a detector device such as a camera configured to feed data back to apparatus external to the apparatus via the conduit. The conduit may therefore comprise one or more electrical cables. The conduit may, alternatively, or additionally, comprise one or more power cables, optical fibres, and/or hoses for the transfer of fluids, depending upon the particular task being carried out, and depending upon the payload being used. The apparatus may be configured to allow the conduit to be fed into the piston and the conduit may be sufficiently resistant to buckling to allow the payload item to be propelled along a pipe or vessel.

For example, the payload may comprise a camera system, with a camera head, comprising a lens and sensor being adapted to reside, when retracted, within the piston. The camera may take an electrical power signal, via the conduit, from an external power supply. The camera may be arranged to provide a signal back through the conduit for viewing on a suitable display.

The payload may alternatively or additionally comprise anything else suitable, e.g. an illuminator, an acoustic transducer, a hose nozzle, alone or in combination.

This feature allows a payload of the apparatus such as a device comprising a detector to be introduced into a pressurised volume such as a pipeline containing pressurised gas or liquid in a convenient manner.

The conduit orifice may comprise a conduit sealing means, arranged to provide a seal between the apparatus and the conduit, preventing or reducing the escape of fluids within the pressurised volume. The conduit orifice may conveniently be located at a second end of the piston, or in a head unit coupled to a second end of the piston.

The head unit may be adapted to have conveniently interchangeable parts, such as seals, collars etc. rendering it suitable for conduits of different diameters.

The payload preferably has a diameter, or other planform dimension, greater than that of the conduit orifice in the head for allowing passage of the conduit. Such an arrangement ensures that the payload cannot be blown out of the orifice under pressure from the fluid within the pipe, or accidentally withdrawn from the orifice.

This feature has the advantage that leakage of pressurised fluid from within the apparatus through the conduit orifice due to withdrawal of the conduit from the apparatus through the conduit orifice may be substantially prevented.

Advantageously the diameter of the conduit may be small compared to the overall diameter of the piston. It will be appreciated that, when in use in an object such as a pipe under some positive pressure, there will be a force attempting to push the conduit, and hence any devices attached thereto out of the orifice. This force is proportional to the planform, or sectional area of the conduit; a thinner conduit will be easier to work with from the point of view of this pressure, in that it will have, when used in a pipe with a positive pressure differential, a reduced force pushing it from the pipe.

It is to be understood that some embodiments of the apparatus may equally be employed with objects under negative pressure, such as vacuum pipelines, vessels, chambers or other objects.

The conduit sealing means may comprise means for providing a pressure seal between the conduit and the apparatus. The seal may comprise, at least in part, a compliant material such as foam rubber. The compliant material may be arranged to fit around the conduit, substantially surrounding it when seen in planform view. The sealing means may further comprise an adjustable clamping mechanism arranged to provide a variable degree of pressure to the seal. The degree of friction imparted to the conduit may therefore be varied by altering the degree of pressure applied to the compliant material. The compliant material may have an orifice formed therein adapted to substantially match the diameter of the conduit, and into which the conduit is arranged to fit. A cut may be formed in the compliant material to allow the conduit to be located in the orifice thereof. The cut may run axially along the material.

Alternatively, the cut may arranged to have a longer path, by providing the cut with a circumferential component to its path. The cut may have a helical path. Thus, the cut may not lie in a plane lying axially along the orifice.

By cutting the compliant material in this manner the surface area of the cut is increased over a straight axial cut, and so any escape pathways for fluids are increased in length. This provides for a more effective seal.

The sealing means may further comprise of resilient material located at one or both ends of the compliant material. The clamping mechanism may be arranged to apply a variable pressure to the resilient material, thereby compressing the compliant material. By increasing the pressure on the seal, the compliant material will tend to press more firmly against the associated conduit, increasing the friction thereon. An increase in pressure will also tend to increase the effectiveness of the seal, so reducing any leakage of fluids from or into the object, depending on whether the object is under positive or negative pressure.

The compliant material may comprise anything suitable, such as rubber or foam rubber. The resilient material may comprise anything suitable, such as nylon, or another polymer material.

A lubricant may be employed between the components making up the seal, and between the seal and the conduit.

The seal means may comprise a plurality of separate seals. The seals may be stacked to provide greater sealing efficiency. The number of seals used in an apparatus may be tailored according to an expected pressure to be encountered within the pipe. The seals may be stacked in a spaced arrangement. Venting means may be arranged to vent fluids present within one or more spaces between the seals. The venting means may be arranged to vent the fluids to the external atmosphere, or to a recovery vessel, where the object is under positive pressure.

Advantageously, the head portion may have one or more handles, to allow the piston to be pushed and pulled into and out from the pipe, and/or rotated with respect to the body member.

Advantageously the apparatus may further comprise a pressure ventilation passage adapted to provide a vent from the inside of the piston to an environment external to the apparatus, optionally to the external atmosphere, along with a valve that, in a first position, isolates the inside of the piston from the external atmosphere, and in a second position permits fluid to flow through the passage. In normal use the valve would be maintained in a closed (i.e. first) position, but may be opened as necessary. The valve allows samples of the contents of the pipe to be taken, or for other fluids to be inserted into the pipe. The valve is also useful following use of the apparatus, to vent off any excess pressure that may be retained within the piston following its use inside a pressurised pipe or the like. Further vents, with respective valves, may be provided between adjacent seals, in embodiments that employ multiple seals, as described above.

Conveniently, the passage and valve may be located at or adjacent the head unit.

The means for venting the second volume to atmospheric pressure may comprise a ventilation tube. The tube advantageously incorporates an isolation valve, to isolate the lower void from the external atmosphere. This valve may advantageously be closed to help maintain the piston at a fixed linear position with respect to the body member, and opened when the piston is required to be moved. This has the advantage that, with the valve closed, the piston is held fixed, to some degree in the linear axis, but is able to rotate freely e.g. for guiding a camera or other payload.

Advantageously, the second volume may be subject to differing pressures, by means of, for example, attachment of a pressure source to an outlet port of the ventilation tube. The pressure source may comprise a fluid pump, a pressurised fluid tank, or may comprise pressurised fluid from within the piston. This may be connected to the outlet port by, for example, connecting a tube from a port on a vent from the inside of the piston mentioned above, to the outlet port of the vent tube of the second volume. A pressure regulation or isolation valve may advantageously be used to provide control of the pressure applied to the second volume. In some embodiments the pressure source may be a negative pressure source.

Controlling the pressure of the second volume in this manner may allow the piston to be moved automatically in some embodiments. Increasing the pressure above ambient will tend to withdraw the piston into the apparatus, whereas lowering the pressure below ambient will tend to push the piston out of the apparatus.

If the second volume is left vented to the external atmosphere, then no net force will be present on the piston, and it can be raised or lowered as desired without the need for an operator to overcome the force caused by pressure within the pipe.

Advantageously, a lower end of the piston may incorporate a cutting or abrading tip or region. This allows the piston to cut through an object such as a pipe made of suitably soft material, such as a plastics pipe. Thus an apparatus according to some embodiments of the present invention may be deployed onto a fitting attached to an object such as a pipe where no hole has yet been cut into the pipe. The cutting portion of the piston may thus be used to cut a hole through which the piston, and the device to be inserted into the pipe, can pass.

Conveniently, the piston may incorporate a port, positioned at its lower end, allowing egress of the payload into the pipe. The port may be provided in or by an open free end of the piston.

Certain embodiments may have the port located in the first end of the piston, and in others it may be at least partially located within the side of the piston. Advantageously, the port comprises a cut-out in a sidewall of the piston at the first end. The port may be provided wholly in a sidewall of the piston. The piston may have means for guiding the payload in a preferred direction, as the payload is pushed out of the piston in use. The means for guiding may comprise a deflector for deflecting the payload to one side, i.e. deflecting the trajectory of the payload away from the axis of the piston, as the payload slides along it. Such a deflector therefore helps to prevent the payload from getting snagged e.g. on the bottom of a pipe, and also assists in guiding it in a desired direction along the pipe. The deflector may comprise a plate mounted at an angle of between 20° and 60° to the piston axis. Alternatively, the deflector may be curved, to provide a gradual change of direction to the payload as it slides against it.

Note that any reference to pipe or pipes of the type with which embodiments of the invention may be used, should be taken to mean, where context permits, any pipe, vessel, chamber, receiver, or any other equivalent object.

Although primarily designed for use with gas pipework, the invention is not limited to such uses, and some embodiments of the invention may have utility with pipes containing other fluids, such as air, water or oil. The skilled person will be aware of material properties when used with such fluids, and so will choose to construct the apparatus using appropriate materials dependent upon a given application.

According to a further aspect for which protection is sought, there is provided an apparatus for providing access to pressurised pipes and the like, as described in the appended claims, and further including a conduit.

According to a yet further aspect of the invention for which protection is sought, there is provided a method of operating a pipeline retriever, the retriever comprising apparatus according to any preceding claim, the method comprising:
i) attaching the apparatus to a fitting of a pipeline or vessel;
ii) lowering a piston of the apparatus into the pipeline or vessel;
iii) orienting the piston to align an egress port thereof towards a desired direction; and
iv) feeding a conduit into the piston, such that the conduit, in turn, pushes on a payload attached thereto, moving the payload out from the piston and into the pipeline or vessel.

Optionally the method comprises feeding conduit into the piston to push the payload along the pipeline or vessel.

According to a still further aspect of the invention for which protection is sought, there is provided a method of accessing a pressurised object such as a pipe or the like, comprising:
attaching a body member of an apparatus to a pipe, vessel or fitting by means of attachment means, the body member having an internal barrel and a hollow piston slidable axially within the body member, whereby the internal barrel is provided in fluid communication with the pipe, vessel or fitting,
the method comprising pressurising an internal volume of the piston by a fluid such that a force exerted by pressurised fluid on the piston in a first axial direction away from the first end of the body member is opposed by a force exerted by pressurised fluid on a counter-pressure portion of the piston in a second axial direction opposite the first,
the method comprising providing a conduit through a conduit orifice to an interior of the piston such that a pressure tight seal is formed between the conduit and conduit orifice,
the method comprising translating a first end of the piston axially into the pipe, vessel or fitting, the piston having a port arranged to allow egress of a payload from the piston into the pipe, vessel or fitting.

In one aspect of the invention for which protection is sought there is provided apparatus for providing access to pressurised pipes and the like. The apparatus may comprise a body member having attachment means for attachment of the body member to a pipe or vessel or a fitting coupled to a pipe or vessel. The body member may have an internal barrel that may be provided in fluid communication with the pipe or vessel or fitting when the body member is attached to the pipe or vessel or fitting. A hollow piston may be slidable axially within the internal barrel. The apparatus may be configured such that when an internal volume of the piston is pressurised by a fluid from the pipe or vessel a force exerted by pressurised fluid on the piston in a first axial direction is opposed by a force exerted by pressurised fluid on a counter-pressure portion of the piston. The apparatus may be provided with a conduit orifice adapted to allow a conduit to be disposed therethrough so as to pass into the apparatus to an interior of the piston, wherein a pressure tight seal is formed between the conduit and conduit orifice. The apparatus may be configured to allow a first end of the piston to be translated axially into the pipe, vessel or fitting, the piston having a port arranged to allow egress of the conduit from the piston into the pipe, vessel or fitting.

In one aspect of the invention for which protection is sought there is provided an apparatus for providing access to an interior of an object such as a pressurised pipe and the like, the apparatus comprising:
a body member, the body member having an internal barrel that may be provided in fluid communication with an interior of the object;
a hollow piston slidable axially within the internal barrel, the apparatus being configured such that when an internal volume of the piston is pressurised by a fluid from the object a force exerted by pressurised fluid on the piston in a first axial direction is opposed by a force exerted by pressurised fluid on a counter-pressure portion of the piston,
the apparatus being provided with a conduit orifice adapted to allow a conduit to be disposed therethrough so as to pass into the apparatus to an interior of the piston, wherein a pressure tight seal is formed between the conduit and conduit orifice,
the apparatus being configured to allow a first end of the piston to be translated axially into the object, the piston having a port arranged to allow egress of the conduit from the piston into the object.

In one aspect of the invention for which protection is sought there is provided an apparatus for providing access to an interior of an object such as a pipe, vessel or the like, the apparatus comprising:
a body member having an internal barrel that may be provided in fluid communication with the interior of the object when the body member;
a hollow piston slidable axially within the internal barrel, the apparatus being configured such that when an internal volume of the piston is subject to an underpressure or overpressure, a force exerted on the piston in a first axial direction is opposed by a force exerted on a counter-pressure portion of the piston,
the apparatus being provided with a conduit orifice adapted to allow a conduit to be disposed therethrough so as to pass into the apparatus to an interior of the piston, wherein a pressure tight seal is formed between the conduit and conduit orifice,
the apparatus being configured to allow a first end of the piston to be translated axially into the object, the piston having a port arranged to allow egress of the conduit from the piston into the object.

A method of accessing an interior of an object such as a pressurised pipe or the like, comprising:
providing an internal barrel of a body member in fluid communication with an interior of the object;
the method comprising pressurising an internal volume of the piston such that a force exerted on the piston in a first axial direction away from the first end of the body member is opposed by a force exerted on a counter-pressure portion of the piston in a second axial direction opposite the first, the method comprising providing a conduit through a conduit orifice to an interior of the piston such that a pressure tight seal is formed between the conduit and conduit orifice, the method comprising translating a first end of the piston axially into the object, the piston being arranged to allow egress of a payload from the piston into the object.

Within the scope of this application it is envisaged that the various aspects, embodiments, examples and alternatives, and in particular the individual features thereof, set out in the preceding paragraphs, in the claims and/or in the following description and drawings, may be taken independently or in any combination. For example features described in connection with one embodiment are applicable to all embodiments, unless such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

One or more embodiments of the invention will now be described, by way of example only, with reference to the accompanying figures in which:

FIG. 8 shows a more detailed view of two components that comprise the seal as used in an embodiment of the invention;

DETAILED DESCRIPTION

Figure 1:
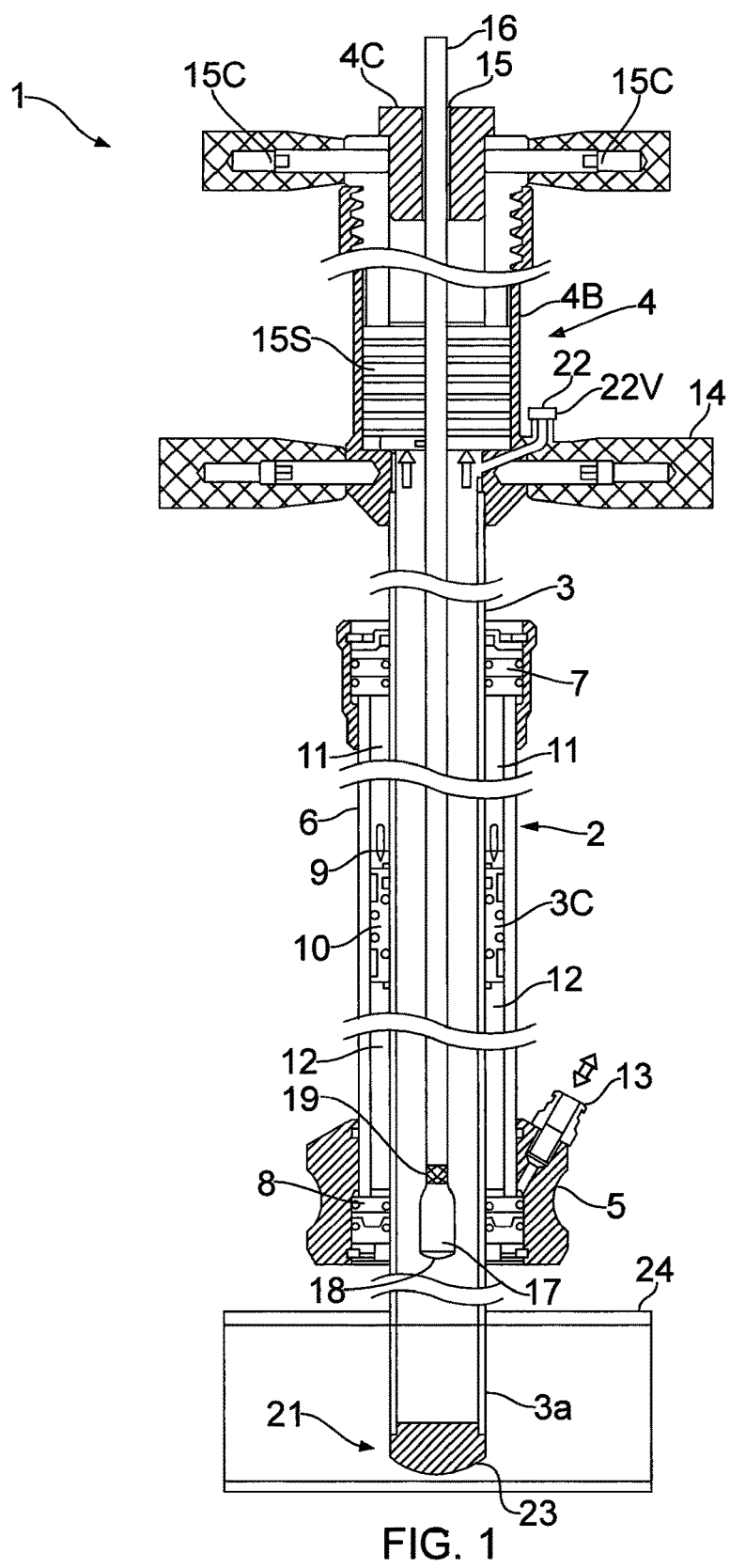
FIG. 1 diagrammatically illustrates a cross-sectional profile view of an embodiment of the invention, mounted on a pipeline.

A first embodiment of the present invention is shown in FIG. 1. An apparatus 1 has major components comprising a body 2, piston 3 and head 4. The body 2 has a base 5 and a cylindrical body tube 6 that is supported by the base 5, the base 5 allowing attachment of the apparatus 1 to a pipe fitting (not shown), which is in turn fitted onto a pipeline 24.

The piston 3 comprises a cylindrical tube located coaxially within the body tube 6.

The outer diameter of the piston 3 is smaller than that of the inside diameter of the body tube 6, so that there exists a separation between them, the separation defining a void. The total planform area of the void is arranged, by suitable choice of respective diameters of the body tube and piston, to be approximately equal to that of the planform area of the piston. The body 2 has gas-tight seals 7, 8 that provide a seal between the piston 3 and body tube 6 at axially spaced locations. The seals 7, 8 support the body 2 and allow the piston 3 to slide relative to the body tube 6, and rotate within the body tube 6.

A first end 3a of the piston 3 has an opening that provides an egress port 21 for materials stored within the piston 3, and which also allows fluids to pass readily in and out of the piston 3. The opening comprises a combination of a hole (or aperture or orifice) at the first end 3a of the piston 3, and a cut-out in a side wall of the piston, the cut-out merging with the hole in the piston end. A deflector plate 23 is attached to the inside of the piston 3 at its first end 3a to nudge any payload, such as a camera system described below, towards a substantially horizontal trajectory on exit from the piston 3.

Attached to the outside of the piston 3 is a collar portion 3C that has a collar element 9 and a gas-tight collar seal 10 that prevents gas from passing between a first void 11 on one side of the collar portion and a second void 12 on the other side. It is to be understood that any pressure differential existing between the first 11 and second 12 voids will tend to push on the collar portion and, in the absence of any other forces, tend to move the piston 3 relative to the body tube 6.

Figure 2:
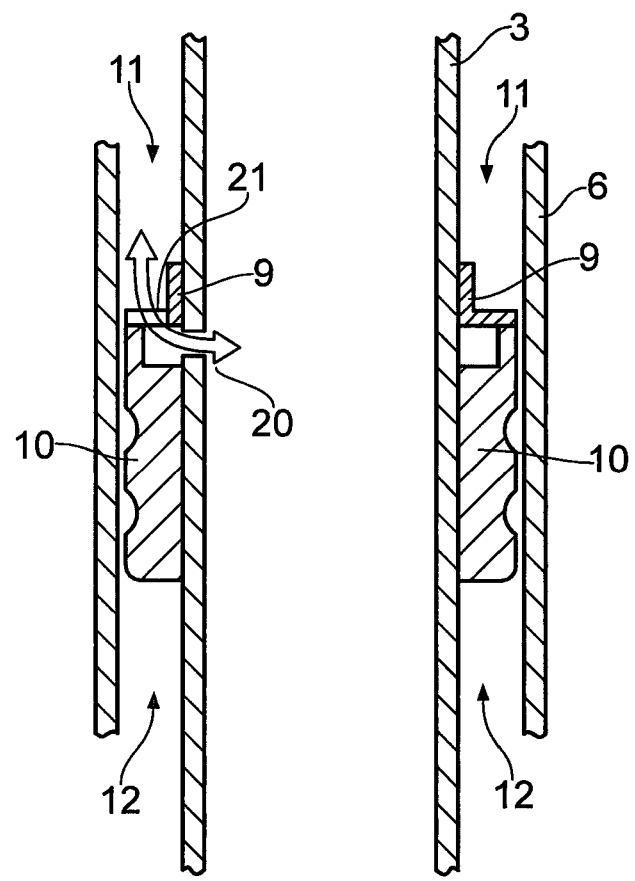
FIG. 2 diagrammatically illustrates a close-up sectional view of a region of the piston incorporating a collar and seal.

The collar element 9 and collar seal 10 are shown enlarged in FIG. 2. FIG. 2 is a part section of the body tube 6 and piston 3. The collar element 9 is welded, or otherwise firmly attached to the piston 3. Just below the level of the collar element 9 as viewed in the orientation of FIG. 2 is an orifice or hole 20 through a wall of the piston 3. A further orifice 21 is present in the collar element 9. Collar seal 10 is attached to the collar element 9, and isolates the first and second voids 12, 11 from each other.

The orifices 20, 21 present in the piston 3 and collar element 9, respectively, allow fluid to pass from the inside of the piston 3 to the first volume 11 but not to the second volume 12. The pressure in the first volume 11 and interior of the piston 3 will therefore tend to equalise.

The base 5 has a vent 13 that provides a passage for fluid to flow from the second void 12 to atmosphere.

The head 4 has a pair of handles 14 attached thereto, which enable the piston to be conveniently raised and lowered, and rotated within the body tube (6) as required. The head also has a conduit orifice 15 at a free end of the head 4 through which a conduit 16 may pass. The orifice 15 is provided in a cap member 4C that is arranged to screw onto a body 4B of the head 4 in order to compress an orifice seal 15S. Compression of the orifice seal 15S causes radial expansion of the seal 15S due to the poisson effect, compressing the seal 15S radially between the conduit 16 and body 4B of the head 4. The feature that the cap member 4C may be screwed onto the body 4B allows the seal 15S to be replaced or cleaned more conveniently. A pair of handles 15C are provided on opposite sides of the cap member 4C to allow the cap member 4C to be screwed onto the body 4B.

In some embodiments, the head 4 may be provided with locking means for locking the conduit 16 in a substantially fixed position, substantially preventing axial insertion or withdrawal of further conduit 16 into or out from the head 4. This feature may be particularly useful when retrieving a payload from a pipe with the apparatus 1 in an upright orientation as shown in FIG. 1. Any tendency of the payload to fall within the piston 3 may be prevented by adjustment of the locking means. The locking means may for example comprise a grip, coupled to the head 4, that is configured releasably to grip the conduit 16 to prevent movement thereof.

A piston vent 22 is present in the head 4 that comprises a passage between the inside of the piston 3 and the outer atmosphere. The vent 22 has a valve 22V that is closed in normal use to prevent the passage of fluid therethrough.

Within the piston 3 may be housed a payload comprising a camera 17 attached to the conduit 16 which is of circular cross section in the present embodiment. The camera may be any suitable camera such as a digital or analogue camera. In the present embodiment the camera 17, in its retracted position within the piston 3, has a lens 18 having an optical axis in line with the axis of the piston 3. The camera 17 also has a flexible neck 19 that allows it to flex to allow it to negotiate corners and bends etc. A light source (not shown) comprising an array of light emitting diodes surrounds the camera lens 18. The conduit 16 is flexible, but is sufficiently rigid to enable it to be pushed along pipework without unduly buckling. The conduit 16 runs from the back of the camera 17 through orifice 15 in the head 4, and on to a spool (not shown). The conduit contains internal wiring that carries a power signal to power the camera 17 and the light source, and also carries a video signal generated by the camera 17 that may be viewed or recorded by suitable equipment.

The conduit has a diameter of approximately 3-20 mm according to the application with which it is to be used, although other diameters may be useful. Other payloads may be employed such as water extraction tooling. In some embodiments the conduit may have a hollow portion such as a hollow core for allowing fluid flow from within a pipeline to a reservoir external to the apparatus. This may allow extraction of liquid such as water from within a pipeline.

The foams, rubbers or the like forming the orifice seal 15S may have radial splits around the perimeter, and be arranged to be wrapped around the conduit behind the payload such as a camera, and then be subject to compression against the conduit to form the seal.

Figure 3:
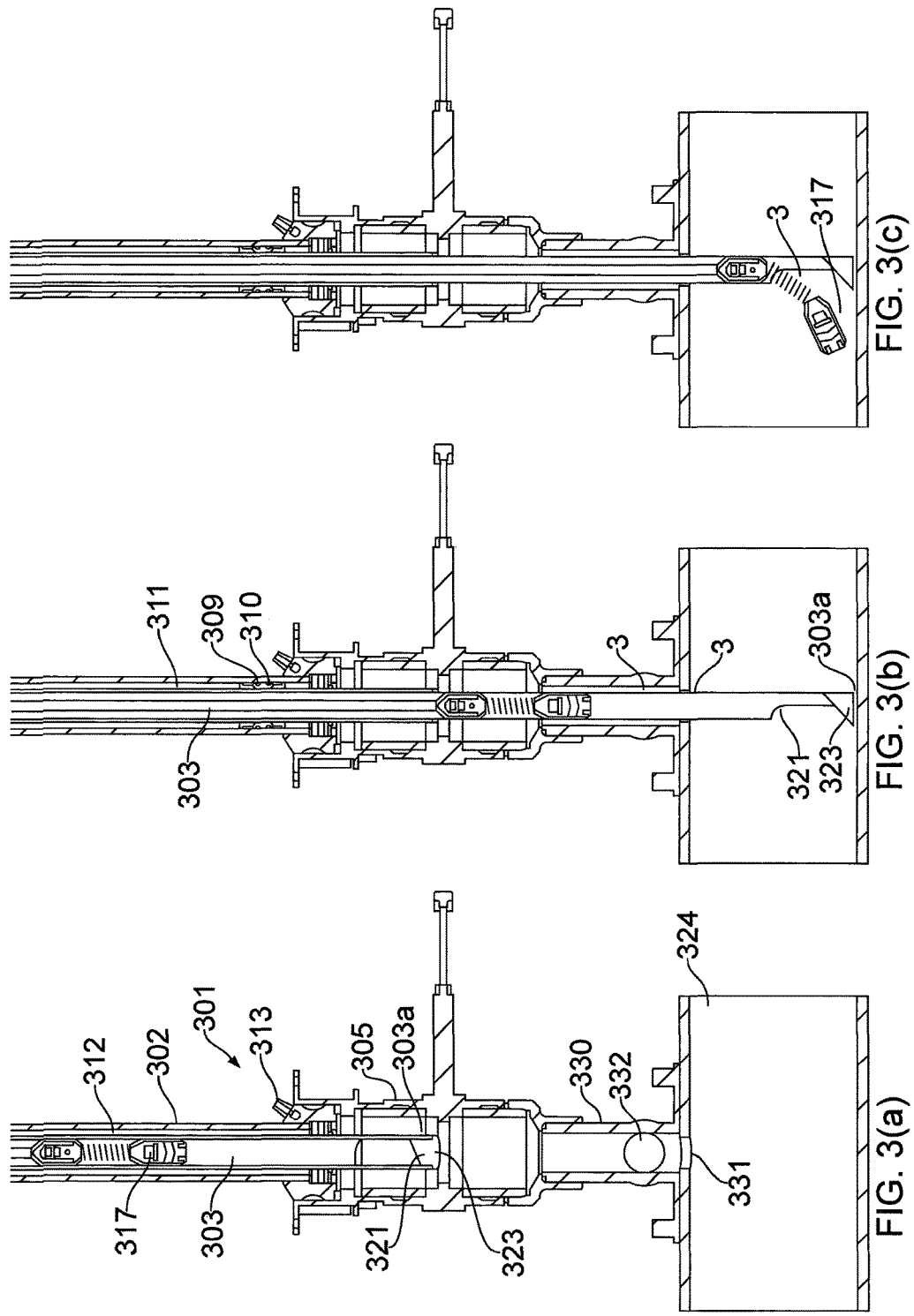
FIG. 3 diagrammatically illustrates a sequence of stages in the deployment of a camera, in an embodiment of the present invention.

Referring to FIG. 3, an embodiment is described, wherein the embodiment is used to insert a payload into a pipeline, the payload being a camera 17 attached to a conduit 16 in this instance. FIGS. 3a-3c show various stages of the camera's deployment. Like features of the embodiment of FIG. 3 to those of the embodiment of FIG. 1 are shown with like reference signs incremented by 300.

FIG. 3a shows a partial view of an embodiment 301 of the present invention comprising a base 305 attached to a cylindrical body member 302. Within the body member 302 is a piston 303 shown in part-section. A lower end 303a of the piston 303 is shown within the base 305, indicating that the piston 303 is currently in a stowed position. At the end 303a of the piston 303 is a deflector plate 323, used to deflect a payload, such as a camera, away from the axis of the piston, as described in relation to previous embodiments.

The upper portion of the body member 302 and piston 303, and the head unit are not shown, so that the detail of the lower part of the apparatus may be more clearly seen.

The base 305 is attached, in use, by means of a screw thread to a pipe fitting 330, which has been previously attached to a gas pipe 324. The pipe 324 has an aperture 331 cut therein which is covered by the fitting 330. An isolation valve 332 on the fitting 330 acts to seal the pipe 324 under normal circumstances (i.e. when the apparatus 301 is not mounted onto the fitting 330), preventing any escape of gas.

A camera 317 is stowed inside the piston 303, as shown in a partial sectional view of the piston 303. The camera is attached at an upper point to a conduit (not shown) which proceeds up to the head and out through a conduit seal therein, as explained in relation to the previous embodiment.

Following attachment of the base 305 to the fitting 330, the isolation valve 332 may be opened. Assuming the fluid in the pipe 324 to be at a positive pressure with respect to the atmosphere, then fluid from the pipe 324 will be forced up through the isolation valve 332 and into the piston 303, as the inside of the piston will previously have been at atmospheric pressure. The increase in pressure will put an upwardly directed force on the piston 303. However, the pressure within the piston 303 will also feed through orifices (20, 21 of FIG. 2) in the side of the piston 303 and the collar element 309 into the first void 311. This will tend to put a downwardly directed force on the collar element 309 and the collar seal 310 that is attached to the piston 303. Since the planform areas of the piston 303, and the collar element 309 and collar seal 310 arrangement are approximately equal, as in the first embodiment described above, then any pressure acting to push the piston 303 out of the pipe 324 will be matched by an approximately equal pressure acting on the collar element 309 and seal 310 arrangement, and the piston 303 will have an approximately zero net force acting to make it slide due to the pressure from fluid within the pipe 324.

Following the opening of the vent 313, the piston 303 may be lowered through the isolation valve 332, and the hole 331 into the pipe 324, as shown in FIG. 3b. The balanced pressures acting upon the piston 303 have substantially no impact on the ability to move the piston 303 within the body tube 306. Any pressure build up which would otherwise occur in the second void 312 due to the collar 309 and seal 310 moving towards the base 305 is vented to atmosphere via the vent 313. The lower end 303a of the piston 303 is shown in FIG. 3b having been pushed down into the pipe 324. The piston 303 has also been rotated to direct the egress port 321 of the piston 303, and the deflector plate 323 in the desired direction. The collar element 309 and collar seal 310 can be seen substantially at the bottom of their range of travel in FIG. 3b. The second void 312 has therefore been reduced to a negligible size. An operator may alternatively prefer to insert the piston only partially into the pipe 324, in which case the operator may lock the piston 303 at the chosen depth. It is to be understood that by closing the vent 313, axial movement of the piston 303 may be constrained. In some embodiments additional means may be provided for locking the piston 303 in a substantially fixed axial position with respect to the body tube 306. For example, in one embodiment a clamp may be provided for clamping the piston 303, the clamp being coupled to the body tube 306 or piston 303 and arranged to clamp the other such that relative movement of the piston 303 and body tube 306 is substantially prevented.

FIG. 3c shows a subsequent step in the process of deploying the camera 317 into the pipeline 324. An operator has fed the conduit 316 down into the apparatus 301, which in turn has pushed the camera 317 axially along the piston 303 towards its lower end 303a, and the camera 317 has started to emerge from egress port 321. Deflector plate 323 has redirected the camera 317 along the pipe 311 as the camera came down the piston 303. A flexible neck 319 on the camera 317 helps it to negotiate the turn. The operator may continue to feed the conduit 316 into the apparatus 301 as required, whilst simultaneously monitoring video signals returned from the camera 317. Alternatively, or as well the video signal may be recorded for future analysis.

During this process, the positive pressure within the pipe 324 will tend to oppose entry of the camera 317 into the pipe. However, the conduit's relatively small diameter means that, with reasonable pressures being present within the pipe 324, such as those commonly present in gas pipes, this force is low enough to be easily overcome by the operator. As noted above, locking means such as a clamp may be arranged to lock the conduit 316 in a given position when required, preventing its egress.

Once an inspection has been completed, or if the camera 317 needs to be withdrawn so that it can be sent down the pipe in the opposite direction, the conduit 316 is withdrawn from the apparatus 301, which pulls the camera 317 back along the pipe 324, and ultimately up into the piston 303. As the diameter of the camera 317 is larger than that of the conduit 316 it is prevented from being accidentally pulled through orifice 315 in the head 304 (not shown).

If a further inspection were required in the opposite direction to the first, then, after withdrawal of the camera 317 into the piston 303, the piston 303 would be rotated to position the egress port 321 in the correct direction, and the conduit 16 fed into the head once more as described above to move the camera 317 to the required location within the pipeline 324.

Otherwise, if the inspection were complete, then the piston 303 would be withdrawn from the pipe 324, and up through the isolation valve 332. The isolation valve 332 would then be closed. At this point the piston 303, and first void 311 are still at the positive pressure of the pipe. This positive pressure can be dissipated by opening the vent valve 22V in the head, as shown in FIG. 1, to expose the inside of the piston 303 to atmospheric pressure.

Appropriate safety precautions would be taken according to the nature of the fluid inside the piston. For example, the fluids may be captured in a suitable fluid container attachable to the vent. The base 305 may then be safely unscrewed from the pipe fitting 330.

Figure 4:
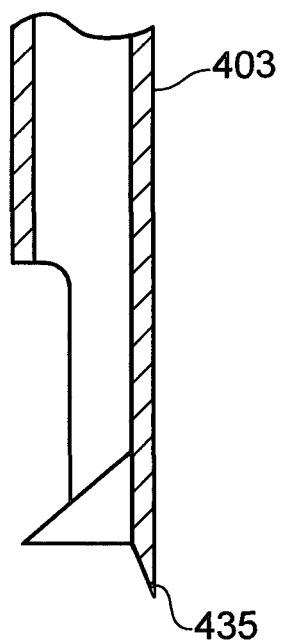
FIG. 4 shows a part of an alternative embodiment of the present invention.

Another embodiment of the invention is shown partially in FIG. 4. This embodiment is suitable for use where a pipe fitting has been attached to a pipe, but where no aperture hole, as shown at reference 331 of FIG. 3, allowing access to an interior of the pipe 324 has yet been provided. FIG. 4 shows just the lower part of a piston 403 of an embodiment, the piston 403 being broadly similar to those described above. However, it differs in that at a lower extremity of the piston 403 a cutting blade 435 is positioned on an outer edge. The cutting blade 435 extends below the level of the rest of the piston 403 by a distance that allows it to cut through a plastic pipe of known thickness. The piston 403 forms part of an embodiment that is otherwise similar to that described in relation to FIG. 3. In use, a base 305 of the apparatus 301 of the embodiment is attached to a pipe fitting 330 in a manner similar to that described above. When isolation valve 332 has been opened, the piston 403 is lowered down until the cutting blade 435 makes contact with the pipe 324. An operator then rotates the piston 403, using handles on the head (not shown) whilst applying a downward force. The cutting blade 401 scores through the material of the pipe 324 until eventually an aperture 331 is cut all the way through, and the cut-out portion of the pipe 324 falls into the inside of the pipe 324 or is retained by the cutting blade 401. The piston 403 may then be lowered down into the pipe 324 for inspection as previously described.

Figure 5:
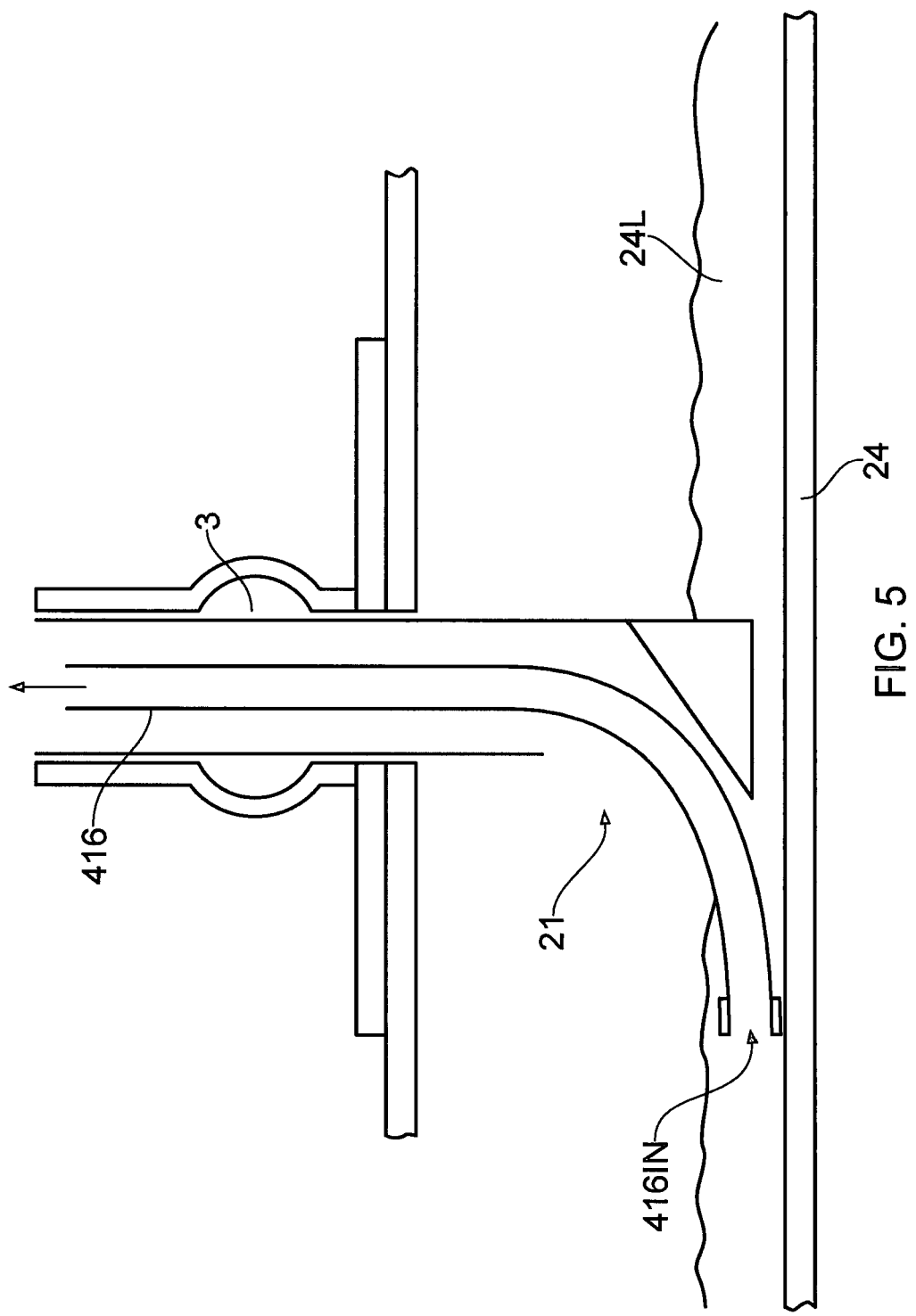
FIG. 5 shows an embodiment employing a hose, used to extract fluid from a pipe or vessel

FIG. 5 shows a portion of the apparatus 1 of FIG. 1 with a different conduit 416 provided therein. In the embodiment of FIG. 5 a conduit 416 in the form of a substantially hollow pipe has been inserted into the piston 3 and through the egress port 21. The conduit is open at its free end, which provides an inlet 4161N suitable for allowing liquid or gas to pass therethrough. In use, the conduit 416 may be introduced into a pipeline 24 or other vessel, as required, in which liquid 24L is present that it is desirable to remove. The inlet 416IN may be immersed in the liquid 24L, and extracted from the pipeline through the conduit 416. It is to be understood that in some embodiments a pump may be employed to pump the liquid from the pipeline 24. In some embodiments a pressure of gas in the pipeline 24 may be sufficiently high to cause expulsion of the liquid through the conduit 416 to a storage tank or other volume that is at a lower pressure than that of the pipeline 24, optionally substantially at atmospheric pressure. It is to be understood that a valve may be provided external to the apparatus 1, to which the conduit 416 is connected, to allow control of liquid flow. It is to be understood that in some embodiments the conduit 416 may be employed to extract gas that is within the pipeline 24 or storage vessel.

Figure 6:
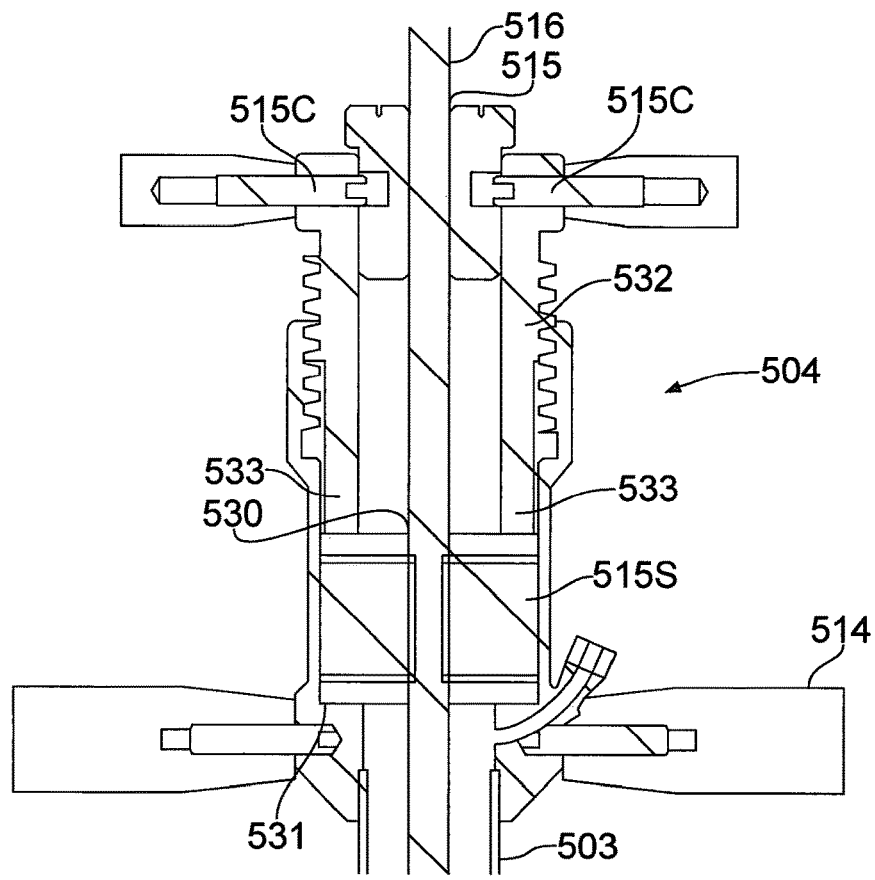
FIG. 6 shows a more detailed view of a head unit of an embodiment of the invention.

FIG. 6 shows in more detail a head portion of an embodiment of the invention. Head unit 504 sits on piston 503, and contains an orifice 515 through which conduit 516 may pass. Sealing means 515S provides a pressure seal preventing or restricting passage of fluid from the piston 503 to the outer atmosphere. The sealing means 515S has an orifice 530 through which the conduit 516 passes. The sealing means 515S sits on a seat 531 at the base of the head 504. A cap member 515 provides an entry point at a first end thereof for a conduit 516 as explained in relation to FIG. 1 above.

The cap member 515 is in the form of a threaded cylinder 532 that forms an upper part of the head 504. A thread of the cylinder 532 engages with a corresponding thread on a lower part of the head 504. The cylinder 532 comprises a pressure bearing portion 533 at a second end thereof, adapted to apply pressure to the sealing means 515S. The degree of pressure applied to the sealing means is determined by screwing the cylinder 532 into or out of the lower part of the head, raising or lowering the pressure bearing portion in relation to the seal 515S.

Figure 7:
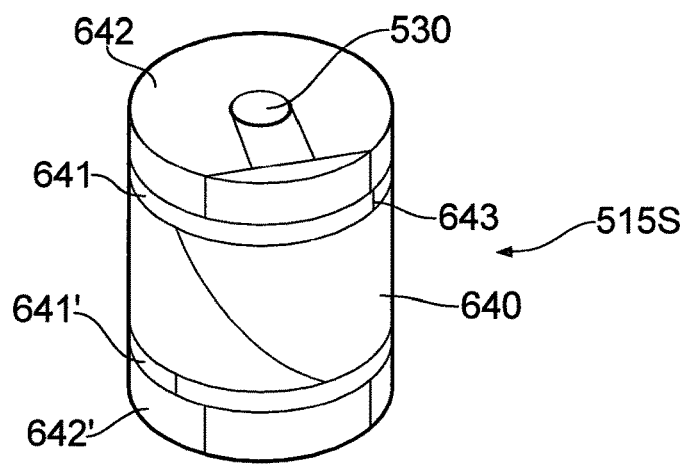
FIG. 7 shows a seal as may be employed in an embodiment of the invention.

Seal 515S is shown in more detail in FIG. 7. The seal comprises a compliant elastic material 640 as its main sealing component, which is a foam rubber cylindrical block in this embodiment. On either end of the foam rubber block sits a layer of thin rubber sheet 641, 641', and forming the end blocks of the seal are a pair of nylon end caps 642, 642'. The end caps 642, 642' each provide a resilient surface able to withstand pressure applied by the cylinder 532 as described in relation to FIG. 6, and countered by the seat 531. An orifice 530 runs through each component and is adapted to house the conduit, and defines an axis of the seal. As an axial pressure is applied to the seal in use, the end caps transmit force to the foam rubber, compressing it. As it compresses axially it will tend to push outwards in the plane orthogonal to the axis as a consequence of the Poisson effect. Thus, it will push against the conduit and sidewall of the head 504, providing, within design limits, a better seal as the axial force is increased.

The foam block 640, rubber layer 641 and end caps 642 are separate components in the present embodiments, being assembled together when required, for example in the field. Each is provided with means for allowing their fitting around a conduit. FIG. 8a shows an end cap 742 similar to end cap 642 of the embodiment of FIG. 7 that has been disassembled allowing it to be fitted to a conduit. The end cap comprises a generally circular (in assembled configuration) disk that has a generally "T" shaped piece 743 arranged to be slidably inserted or removed from the remaining portion 744. Web portions 745, 745' on sliding piece 743 are adapted to engage with corresponding slots 746, 746' on the remaining piece 744.

FIG. 8*b* shows a foam rubber sealing member 740 similar to that of member 640 shown in FIG. 7. The sealing member 740 is of a cylindrical form, with orifice 741, for receiving a conduit, running along the axis. A cut 740C in the foam provides access for the conduit to the orifice 741 when assembling the seal. The cut 740C runs in a generally helical path along the axis of the member 740. By having a cut path that is not purely axial, the surface area of the cut region is increased, which acts to increase the length of any leakage path that may exist when the seal is assembled and in-situ in an embodiment of the invention. Also, axial pressure on the seal will act to push the cut portions together in such an embodiment, improving the seal performance, whereas this would not occur if the cut ran straight down the axis of the member 740.

Figure 9:
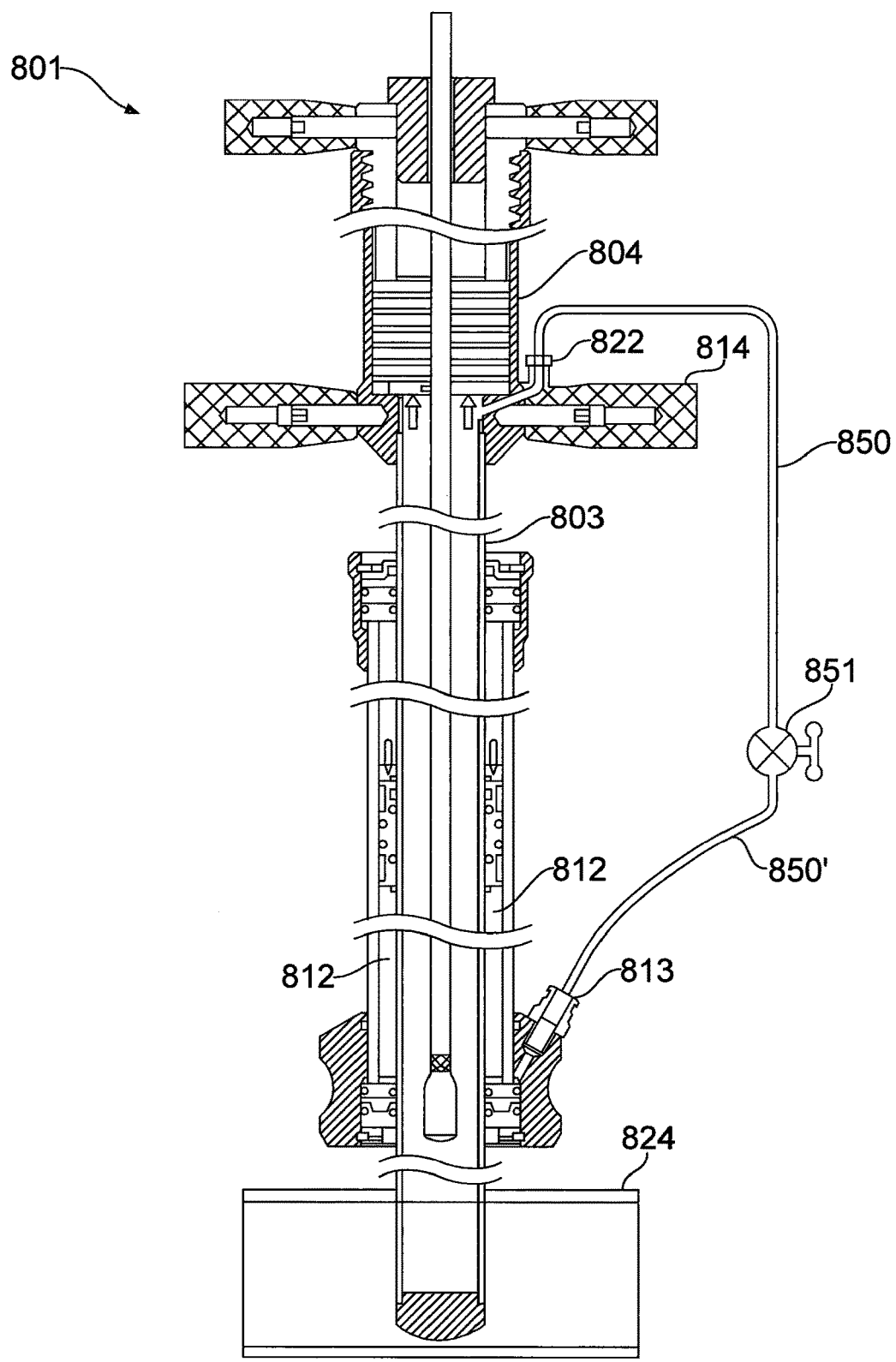
FIG. 9 shows an embodiment comprising means for pressurising the lower volume to provide automated movement of the piston.

FIG. 9 shows an embodiment of the invention similar to that of FIG. 1, but wherein means has been provided for automating movement of the piston. The embodiment is generally similar to that of FIG. 1, and those parts that are identical will not be further described in detail. Apparatus 801 is shown in use on a pipe 824 which is at a positive pressure with relation to the outer atmosphere. An inside region of piston 803 is, in use, at the same positive pressure as the pipe 824 when the pipe 824 is open to the apparatus 801 by means of a valve fitting (not shown), the valve fitting providing the means by which the apparatus 801 is mounted to the pipe 824. Valve 822 is connected to a tube 850 that runs via adjustable valve 851 to vent 813 in the base of the apparatus 801. Valve 851 may be opened to allow the flow of fluid therethrough. Valve 851 may also allow that portion 850' of the tube 850 that lies between the valve 851 and the vent 813 to be vented to external atmosphere. By allowing fluid from piston 803 to flow through to lower volume 812, the resulting pressurisation of volume 812 will tend to push piston 803 in an upward direction (in the figure as shown), so withdrawing the piston 803 from the pipe 824. By closing the valve, and venting tube 850' to external atmosphere, the piston will be free to be moved by an operator pulling or pushing on handles 814. Applying a negative pressure by some means (not shown), in relation to the external atmosphere, will tend to move the piston into the pipeline 824. In certain orientations the weight of head 804 will tend to push down on the piston 803, so pushing the piston 803 into pipeline 824. Furthermore, by application of a negative pressure to the volume 812 by some means (not shown), in relation to the external atmosphere, will tend to move the piston 803 into the pipeline 824. Thus, by careful control of valve 851, a degree of automation of the position of the piston 803 relative to the pipe 824 may be achieved.

Figure 10:
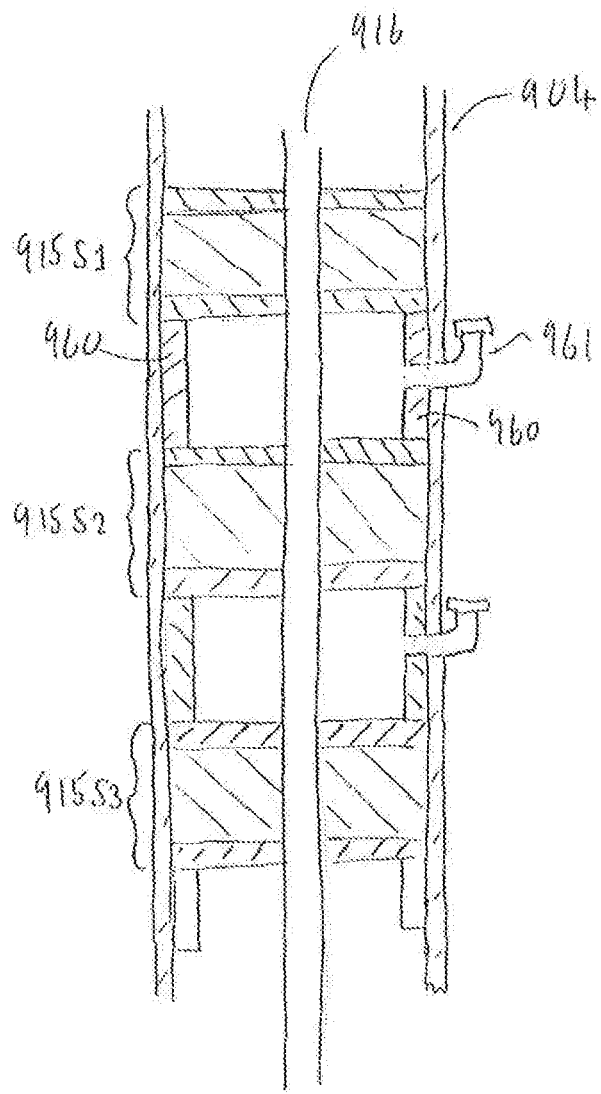
FIG. 10 shows an alternative embodiment employing a plurality of seals in a head unit.

FIG. 10 shows an alternative seal arrangement that may be employed in some embodiments of the invention. A sectional view of a portion of a head unit 904 is shown, with three seals 915S1-915S3 stacked in series, each similar in construction to that of FIG. 7. Separating each seal is a resilient spacer collar 960 which maintains each seal separate and in spaced apart relationship from its neighbour. Each collar 960 has ventilation holes that allow fluid pressure contained within the space occupied by the collar 960 to be vented through a vent 961. The vents 961 may vent fluid to atmosphere or to a collection vessel. Conduit 916 is shown passing through an orifice in each seal.

The arrangement of FIG. 10 is particularly suited to applications where an apparatus according to embodiments of the invention may be employed with particularly high fluid pressures. Using a plurality of seals enables each individual seal to take part of the pressure loading provided by the fluid pressure, sharing the overall pressure loading. Vents such as vents 961 enable the spaces between each seal to be vented to e.g. the external atmosphere, a collection vessel, or a flame stack if required. Although FIG. 10 shows three seals, it will be appreciated that a greater or fewer number of seals may be used, depending upon the particular application.

Throughout the description and claims of this specification the apparatus has been described in the sense of it being operated in an upright, vertical manner, with the head at the top, and the base at the bottom, with the words, "upper" and "lower", "up" and "down" etc. being used in this context. This is purely for convenience of explanation, and it will be appreciated by a normally skilled person that the apparatus may be employed in various orientations according to particular requirements.

Embodiments of the present invention may be understood by reference to the following numbered paragraphs:

1. An apparatus for providing access to pressurised pipes and the like, the apparatus comprising:
   a body member having an attachment portion for attachment of the body member to a pipe or vessel or a fitting suitable for attaching the body member to a pipe or vessel, the body member having an internal barrel that may be provided in fluid communication with the pipe or vessel or fitting when the body member is attached to the pipe or vessel or fitting;
   a hollow piston slidable axially within the internal barrel, the apparatus being configured such that when an internal volume of the piston is pressurised by a fluid from the pipe or vessel a force exerted by pressurised fluid on the piston in a first axial direction is opposed by a force exerted by pressurised fluid on a counter-pressure portion of the piston,
   the apparatus being provided with a conduit orifice adapted to allow a conduit to be disposed therethrough so as to pass into the apparatus to an interior of the piston, wherein a pressure tight seal is formed between the conduit and conduit orifice,
   the apparatus being configured to allow a first end of the piston to be translated axially into the pipe, vessel or fitting, the piston being arranged to allow egress of the conduit from the piston into the pipe, vessel or fitting.

2. An apparatus according to paragraph 1 wherein the piston has an outer diameter smaller than that of the barrel, the body member incorporating first and second sealing portions each arranged to provide a pressure seal between the barrel and the piston at respective first and second axially displaced positions with respect to the barrel, thereby defining a volume therebetween, the counter pressure portion forming a seal between the piston and barrel thereby to isolate respective parts of the volume between the first and second sealing portions on each side of the counter-pressure portion into a first volume between the counter-pressure portion and first sealing portion and a second volume between the counter-pressure portion and second sealing portion such that the relative size of the volumes changes as the piston slides axially within the barrel,
   the apparatus further being configured to allow equalisation of pressure between an inside region of the piston and the first volume, and to maintain the second volume substantially at a predetermined or substantially constant pressure such as atmospheric pressure.

3. An apparatus according to paragraph 2 wherein the counter-pressure portion comprises a collar portion provided around an outer periphery of the piston.

4. Apparatus according to any preceding paragraph wherein a planform area of the counter-pressure portion is arranged to be substantially similar to that of the planform area of the piston such that the force exerted on the piston by pressurised fluid in the first axial direction away from the first end of the body member is substantially equal to the force exerted by pressurised fluid on the counter-pressure portion in the second axial direction opposite the first.

5. Apparatus according to any preceding paragraph configured to allow the piston to be translated such that at least a portion of the piston at a first end of the piston projects out from the first end of the body portion.

6. Apparatus according to paragraph 5 wherein the piston comprises a port arranged to allow egress of a payload from the piston, the apparatus being configured to allow the first end of the piston to be translated out from the piston thereby to expose the port.

7. Apparatus according to paragraph 6 wherein the port is provided substantially at the first end of the piston.

8. Apparatus according to paragraph 6 or paragraph 7 wherein at least a portion of the port is provided in a sidewall of the piston.

9. Apparatus as described in any one of paragraphs 6 to 8 wherein the piston incorporates a deflector located at or adjacent the port, the deflector being arranged, in use, to deflect a payload passing axially down the piston into a non-axial direction.

10. Apparatus as described in any preceding paragraph comprising one or more handles arranged to facilitate axial and/or rotational movement of the piston by a user.

11. Apparatus according to any preceding paragraph wherein the piston comprises the conduit orifice.

12. Apparatus according to any preceding paragraph wherein the conduit orifice comprises at least one seal for providing a pressure seal between a conduit and the apparatus.

13. Apparatus according to paragraph 12 further configured to allow adjustment of a degree of friction between the seal and a conduit.

14. Apparatus according to paragraph 12 or 13 wherein the seal comprises a compliant material adapted to surround a conduit.

15. Apparatus according paragraph 14 wherein the seal further comprises resilient end caps arranged in use to exert compressive pressure upon the compliant material.

16. Apparatus according to any of paragraphs 12 to 15 wherein the compliant material has an orifice running through it adapted to receive a conduit.

17. Apparatus according to paragraph 16 wherein the compliant material has a cut therein facilitating it being attached to a conduit.

18. Apparatus according to paragraph 17 wherein the cut does not lie on a plane axial with the orifice.

19. Apparatus according to paragraph 17 or 18 wherein the cut is generally helical in form.

20. Apparatus according any of paragraphs 12 to 19 wherein, in use, a plurality of separate seals are attached to a conduit.

21. Apparatus according to paragraph 20 wherein the plurality of seals are arranged in a stack formation.

22. Apparatus according to paragraph 21 wherein a separation between an adjacent pair of seals defines a space and wherein a vent is provided allowing venting of pressure within the space.

23. An apparatus according to any preceding paragraph comprising a vent allowing fluids to pass from the inside of the piston to an environment external to the apparatus, wherein the vent comprises an isolation valve.

24. An apparatus as according to paragraph 23 wherein the isolation valve is located at or adjacent a second end of the piston opposite the first.

25. An apparatus according to paragraph 2 or any paragraph depending therethrough comprising a ventilation tube having a valve for maintaining the second volume substantially at a predetermined pressure, said valve having an open and a closed position, wherein, in the closed position, the second volume is isolated from an external atmosphere.

26. Apparatus according to paragraph 25 wherein an outlet port of the valve is adapted to receive a pressure source.

27. Apparatus according to paragraph 26 wherein the pressure source is one of: atmospheric pressure; a fluid pump; or, when dependent upon paragraph 23, a connection to the vent of paragraph 23.

28. An apparatus according to any preceding paragraph wherein the piston is adapted to receive a cutting element on a lower portion thereof.

29. An apparatus according to any preceding paragraph wherein the piston has a cutting element located at a first end.

30. An apparatus according to paragraph 28 or paragraph 29 wherein the cutting element is adapted to be suitable for cutting through an associated pipe or vessel.

31. An apparatus according to paragraph 29 or paragraph 30 wherein, in use, the cutting element is adapted to cut through the pipe or vessel as the piston is rotated about its axis.

32. An apparatus according to paragraph 31 wherein the cutting element is arranged to cut a hole into the pipe or vessel allowing the piston to pass therethrough.

33. An apparatus as described in paragraph 2 or any paragraph depending therethrough comprising an equalisation orifice arranged to provide fluid communication between the internal volume of the piston and the first volume, to allow equalisation of pressure between the internal volume of the piston and the first volume.

34. An apparatus according to any preceding paragraph further including a payload portion connected to a conduit.

35. Apparatus according to paragraph 34 wherein the conduit is arranged such that it is disposed through the conduit orifice.

36. An apparatus as described in paragraph 34 or 35 wherein the payload portion has a planform dimension greater than the diameter of the conduit orifice such that the payload portion is unable to be removed from the apparatus through the conduit orifice.

37. An apparatus as described in any one of paragraphs 34 to 36 wherein the payload portion comprises a camera system.

38. A pipe, vessel or fitting for attachment to a pipe or vessel having apparatus according to any preceding paragraph coupled thereto.

39. A method of operating a pipeline retriever, the retriever comprising apparatus according to any preceding paragraph, the method comprising:
   attaching the apparatus to a pipe, vessel or a fitting attached to a pipe or vessel; and
   lowering a piston of the apparatus into the pipe, vessel or fitting.

40. A method according to paragraph 39 comprising orienting the piston to align an egress port thereof towards a desired direction.

41. A method according to paragraph 39 or 40 comprising feeding a conduit into the piston or vessel, such that the conduit, in turn, pushes on a payload attached thereto, moving the payload out from the piston and into the pipe or vessel, and, as more conduit is fed into the piston, pushing the payload along the pipe or vessel.

42. A method of accessing a pressurised pipe and the like, comprising:

attaching a body member of an apparatus to a pipe, vessel or fitting by means of attachment means, the body member having an internal barrel and a hollow piston slidable axially within the body member, whereby the internal barrel is provided in fluid communication with the pipe, vessel or fitting, the method comprising pressurising an internal volume of the piston by a fluid such that a force exerted by pressurised fluid on the piston in a first axial direction away from the first end of the body member is opposed by a force exerted by pressurised fluid on a counter-pressure portion of the piston in a second axial direction opposite the first, the method comprising providing a conduit through a conduit orifice to an interior of the piston such that a pressure tight seal is formed between the conduit and conduit orifice, the method comprising translating a first end of the piston axially into the pipe or vessel, the piston being arranged to allow egress of a payload from the piston into the pipe or vessel.

43. A method according to paragraph 42 comprising providing the conduit through the conduit orifice prior to attaching the apparatus to the fitting.

44. A method according to paragraph 42 or 43 comprising providing a payload within the internal volume of the piston, whereby the payload is coupled to the conduit.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. An apparatus for providing access to an interior of an object such as a pressurized pipe or the like, the apparatus comprising:

a body member comprising an internal barrel that is configured to be provided in fluid communication with an interior of the object; and a hollow piston slidable axially within the internal barrel, wherein, if an internal volume of the piston is pressurized by a fluid from the object, a force exerted by pressurized fluid on the piston in a first axial direction is opposed by a force exerted by pressurized fluid on a counter-pressure portion of the piston;

wherein the apparatus comprises a conduit orifice adapted to allow a conduit to be disposed therethrough so as to pass into the apparatus to an interior of the piston, wherein a pressure tight seal is formed between the conduit and the conduit orifice, wherein the apparatus is configured to allow a first end of the piston to be translated axially into the object, the piston having a port arranged to allow egress of the conduit from the piston into the object.

2. The apparatus according to claim 1, wherein the piston has an outer diameter smaller than that of the barrel, the body member incorporating first and second sealing portions, each arranged to provide a pressure seal between the barrel and the piston at respective first and second axially displaced positions with respect to the barrel, thereby defining a volume therebetween, the counter pressure portion forming a seal between the piston and barrel thereby to isolate respective parts of the volume between the first and second sealing portions on each side of the counter-pressure portion into a first volume between the counter-pressure portion and first sealing portion and a second volume between the counter-pressure portion and second sealing portion such that a relative size of the first and second volumes changes as the piston slides axially within the barrel, wherein the apparatus is further configured to allow equalization of pressure between an inside region of the piston and the first volume, and to maintain the second volume substantially at a predetermined or substantially constant pressure such as atmospheric pressure.

3. The apparatus according to claim 2, wherein the counter-pressure portion comprises a collar portion provided around an outer periphery of the piston.

4. The apparatus according to claim 2, further comprising a ventilation tube having a valve for maintaining the second volume substantially at a predetermined pressure, said valve having an open and a closed position, wherein, in the closed position, the second volume is isolated from an external atmosphere.

5. The apparatus according to claim 4, wherein the valve has an outlet port that is adapted to receive a pressure source.

6. The apparatus according to claim 2, further comprising an equalization orifice arranged to provide fluid communication between the internal volume of the piston and the first volume, and to allow equalization of pressure between the internal volume of the piston and the first volume.

7. The apparatus according to claim 1, wherein a planform area of the counter-pressure portion is arranged to be substantially similar to that of a planform area of the piston such that the force exerted on the piston by pressurized fluid in the first axial direction away from the first end of the body member is substantially equal to the force exerted by pressurized fluid on the counter-pressure portion in the second axial direction opposite the first.

8. The apparatus according to claim 1, further configured to allow the piston to be translated such that at least a portion of the piston at a first end of the piston projects out from the first end of the body member.

9. The apparatus according to claim 8, wherein the piston comprises a port arranged to allow egress of a payload from the piston, the apparatus being configured to allow the first end of the piston to be translated out from the piston thereby to expose the port, wherein the piston incorporates a deflector located at or adjacent the port, the deflector being arranged, in use, to deflect a payload passing axially down the piston into a non-axial direction.

10. The apparatus according to claim 1, further comprising one or more handles arranged to facilitate axial and/or rotational movement of the piston by a user.

11. The apparatus according to claim 1, wherein the conduit orifice comprises at least one seal for providing a pressure seal between the conduit and the apparatus, wherein the seal comprises a compliant material adapted to surround the conduit, and wherein the seal further comprises resilient end caps arranged in use to exert compressive pressure upon the compliant material, wherein the compliant material has an orifice running through it adapted to receive the conduit.

12. The apparatus according to claim 11, wherein the compliant material has a cut therein facilitating attachment to the conduit, and wherein the cut is generally helical in form.

13. The apparatus according to claim 11 wherein, in use, a plurality of separate seals are attached to the conduit, wherein the plurality of seals are arranged in a stack formation, wherein a separation between an adjacent pair of seals of the plurality of seals defines a space, and wherein a vent is provided allowing venting of pressure within the space.

14. The apparatus according to claim 1, further comprising a vent allowing fluids to pass from the inside of the piston to an environment external to the apparatus, wherein the vent comprises an isolation valve.

15. The apparatus according to claim 1, wherein the piston has a cutting element located at a first end, wherein the cutting element is adapted to cut through an associated object as the piston is rotated about its axis, and wherein the cutting element is arranged to cut a hole into the associated object allowing the piston to pass therethrough.

16. The apparatus according to claim 1, further comprising a payload portion connected to the conduit.

17. The apparatus according to claim 16, wherein the payload portion comprises a camera system.

18. A method of operating a retriever, the retriever comprising the apparatus according to claim 1, the method comprising:
providing the apparatus in fluid communication with an interior of an object such as a pipe or vessel; and
lowering a piston of the apparatus into the object.

19. The method according to claim 18, further comprising orienting the piston to align an egress port thereof towards a desired direction, the method further comprising feeding the conduit into the piston or vessel, such that the conduit, in turn, pushes on a payload attached thereto, moving the payload out from the piston and into the object, and, as more of the conduit is fed into the piston, pushing the payload along an interior of the object.

* * * * *